United States Patent
Whistler

[15] 3,699,170
[45] Oct. 17, 1972

[54] DIMETHYL SULFOXIDE-SULFUR TRIOXIDE COMPLEX

[72] Inventor: Roy L. Whistler, Wabash Township, Tippecanoe County, Ind.

[73] Assignee: Purdue Research Foundation, Lafayette, Ind.

[22] Filed: July 22, 1969

[21] Appl. No.: 871,087

Related U.S. Application Data

[60] Division of Ser. No. 635,663, May 3, 1967, Pat. No. 3,507,855, which is a continuation-in-part of Ser. No. 575,982, Aug. 30, 1966, abandoned.

[52] U.S. Cl. ............................................. 260/607 D
[51] Int. Cl. .......................................... C07c 142/02
[58] Field of Search ............................... 260/607 D

[56] References Cited

OTHER PUBLICATIONS

Gilbert " Sulfonation and Related Reactions" (May 28, 1965) p. 18

Primary Examiner—Lewis Gotts
Assistant Examiner—D. R. Phillips
Attorney—Elwood S. Kendrick and Kendrick, Subkow and Stolzy

[57] ABSTRACT

A sulfur trioxide-dimethyl sulfoxide complex containing from 1 to about 3 moles of dimethyl sulfoxide for each mole of sulfur trioxide.

1 Claim, No Drawings

DIMETHYL SULFOXIDE-SULFUR TRIOXIDE COMPLEX

This application is a division of my prior copending application Ser. No. 635,663, filed May 3, 1967 (now U.S. Pat. 3,507,855) which is in turn a continuation-in-part of my prior U.S. Pat. application, Ser. No. 575,982, filed Aug. 30, 1966, and now abandoned.

This invention relates to a method of preparing cellulose sulfates and starch sulfates.

Sulfate esters of cellulose and starch have been prepared by a number of methods described in the literature. These methods all suffer from various disadvantages. Thus, for example, many of the methods which have been described lead to a substantial degree of degradation, i.e., depolymerization of the cellulose or starch during the process of esterification, so that, while a sulfate ester is produced, its molecular weight is not nearly as high as would have been the case had not degradation taken place. This leads to products which are relatively less desirable for many purposes, including those which depend upon gel formation and the colloidal nature of the sulfate ester and of its salts. Again, other methods have been proposed which are carried out in the presence of tertiary amines, such as triethylamine, pyridine, and the like, but the resulting esters are in the form of an organic salt such as a pyridinium salt, which must be removed and substituted by sodium or hydrogen, for example, in order to obtain the ultimately desired product, and incidentally to obviate the consumption of a relatively expensive organic chemical.

An object of the present invention is to provide a process for producing sulfate esters of cellulose or starch in which the cellulose or starch remains relatively undegraded, and thus the end product exhibits colloidal properties with a desired degree of substitution.

Further objects of the invention will appear as the description thereof proceeds.

Generally speaking, and in accordance with illustrative embodiments of the invention, there is formed a complex of sulfur trioxide and dimethyl sulfoxide, which is used as a sulfating reagent for cellulose or starch.

The admixture of the cellulose or starch with a diluent, and preferably with dimethyl sulfoxide, facilitates recovery of the said diluent following the reaction. A prior admixture of the cellulose or starch with such a diluent minimizes heat problems and minimizes degradation at the time the cellulose or starch is contacted with the reaction complex.

In preparing the reaction complex, a relatively large molar excess of dimethyl sulfoxide may be present for each mole of sulfur trioxide. In carrying out the reaction with cellulose or starch, an excess of the dimethyl sulfoxide is desired and preferably, in addition thereto, premixing of the cellulose or starch with a further quantity of dimethyl sulfoxide. Other organic solvents, however, may be used as diluents for the cellulose. Illustrative organic solvents are chloroform, benzene, and the like.

An excess of dimethyl sulfoxide in the complex gives assistance in heat control during the sulfation. The dimethyl sulfoxide can be used in an amount in the range of one to 50 or more times the weight of the cellulose or starch. Thus, for example, with 100 g. of cellulose there may be used from 1000 to 5,000 g. of dimethyl sulfoxide. Even larger amounts of diluent are not precluded and may be employed.

Any available form of cellulose may be used, and the choice thereof will in general be determined by the purity and nature of the product desired. Thus, long fiber cotton gives the choicest product, but is relatively expensive. Chemically treated cotton linters are a preferred source of cellulose; a further and adequate source of cellulose is cellulose derived from wood. Even ground wood can be used, particularly those varieties relatively rich in cellulose and relatively poor in lignin and the other constituents, although these lead to relatively low grade products. The word cellulose as used herein and in the appended claims includes cellulose from various sources and in the foregoing forms.

Likewise, any form of starch may be employed such as waxy maize starch, corn starch, potato starch, tapioca starch, or the like. The starch employed may be in either its naturally occuring state or may be pregelatinized.

The reaction temperature can be varied but preferably is kept at about room temperature, i.e., 15°–25° C. The reaction time for relatively complete esterification is in the order of one-half hour to several hours, depending, of course, upon the selected temperature and the relative concentrations of the reactants, including the diluent and sulfur trioxide in the reaction mixture.

Since the complex of sulfur trioxide and dimethyl sulfoxide reacts preferentially with water, the starting cellulose should be dry. Other wise, the complex is consumed in reaction with water.

The product which is obtained immediately following the esterification may be neutralized by adding the calculated amount of aqueous solutions of an alkali metal or ammonium hydroxide, carbonate or bicarbonate. The resulting neutralized product may be precipitated by addition of a lower alcohol, acetone or other water miscible solvent.

It will, of course, be understood that the ester products are half esters of sulfuric acid. Thus, one of the hydrogen ions originally present in the sulfuric acid is still free to react to give salts. To illustrate, in the case of the sodium cellulose sulfate ester which may be prepared in accordance with the invention, one of the valencies of the sulfuric acid is esterified with a hydroxyl group of the cellulose, and the other is neutralized by salt formation with a sodium ion.

Some examples of procedures and products thereof in accordance with my invention follow, in which "DMSO" indicates dimethyl sulfoxide, "D.S." indicates degree of substitution, and viscosities in aqueous suspension at the indicated concentration were determined using a modified Ubbelohde Viscometer.

EXAMPLE I

Liquid sulfur trioxide (10 ml.) was added dropwise with stirring to 100 ml. of dimethyl sulfoxide cooled in an ice-bath over a period of 10 minutes. The water-white complex solution was stored in a refrigerator and used within 45 minutes of preparation. Before use, the final concentration of sulfur trioxide in a 2 ml. aliquot of the solution was determined by addition of 5 ml. of water and titration with 0.2 N sodium hydroxide solution.

One gram of Whatman Cellulose was added with stirring to a solution of dimethyl sulfoxide containing the desired amount of sulfur trioxide. After stirring for the required time, 25 ml. of distilled water were added; the solution was neutralized with solid sodium bicarbonate, and the polymer was precipitated by addition of ethanol. The precipitate was dissolved in water and dialyzed several days against distilled water; the water solution was concentrated under reduced pressure, and the polymer was isolated by freeze-drying. In this manner, molar ratios of sulfur trioxide per D-glucose unit, temperature, and time were varied.

The Whatman cellulose employed was Column Chromedia CF-2 cellulose powder.

The results obtained by varying the molar ratio of sulfur trioxide to the weight of the D-glucose unit present are shown in the following Table I, where 1 g. of Whatman powdered cellulose in 65 ml. of dimethyl sulfoxide (DMSO) solution was reacted with varying quantities of the complex prepared as described above. The reactions reported in Table I were all conducted at 25° C. for 1 hour; the D.S. of the products was determined by the Schoniger combustion method as reported at page 276 of "Quantitative Organic Microanalysis," by A. Steyermark, Academic Press, New York (1961). The limiting viscosity, expressed in deciliters per gram, was determined by viscosity measurements made in 0.05 N aqueous sodium chloride solutions using a modified Ubbelohde Viscometer as reported in "Handbuch der Chemie und Technologie der Öle 1," 340 (1908), by L. Ubbelohde.

TABLE I

| Molar Ratio Sulfur Trioxide: D-glucose unit | % Yield of Soluble Non-dialyzable Polymer | Sulfate (D.S.) | viscosity (dl./g.) |
| --- | --- | --- | --- |
| 3:1 | 93.8 | 1.30 | 1.29 |
| 6:1 | 100 | 1.53 | 1.30 |
| 9:1 | 100 | 1.63 | 1.39 |
| 21:1 | 100 | 1.59 | 1.39 |

When Whatman powdered cellulose is treated in dimethyl sulfoxide at 25° C. with different concentrations of sulfur trioxide, sulfation takes place to different extents as shown in Table I. Low concentrations of sulfur trioxide do not lead to complete dissolution of the cellulose in a 1 hour reaction period. Thus, a 3:1 molar ratio of sulfur trioxide per D-glucose unit caused 93.8 percent of the cellulose to dissolve while complete solution was obtained at molar ratios of 6:1 and higher.

EXAMPLE II

In further experiments using 1 gram of Whatman powdered cellulose in 65 ml. of DMSO solution, the reaction times were varied while using sufficient SO₃·DMSO complex, prepared as in Example I, to give a 6:1 molar ratio of sulfur trioxide per weight of D-glucose unit. These reactions were conducted at 25° C. and the D.S. and viscosity of the product were determined as in Example I.

TABLE II

| Time (minutes) | % Yield of Solid Non-dialyzable Polymer | (D.S.) | viscosity (dl./g.) |
| --- | --- | --- | --- |
| 7 | 97 | 1.53 | 1.17 |
| 15 | 100 | 1.62 | 1.21 |
| 30 | 100 | 1.53 | 1.41 |
| 60 | 100 | 1.53 | 1.30 |
| 180 | 100 | 1.53 | 1.32 |

As shown in Table II, no advantage was gained on longer exposure of the cellulose to the reaction medium and the reaction can be properly conducted for the length of time required to solubilize the cellulose. Additional reaction time may produce increased amounts of lower molecular weight, dialyzable material without increasing the degree of sulfation of the recovered product. The mild nature of the sulfation procedure employed in Example II is demonstrated by the fact that extended reaction periods caused little change in the D.S. and the viscosity of the dialyzed product.

EXAMPLE III

In further experiments, 1 gram of powdered Whatman cellulose in 30 ml. of DMSO was reacted with SO₃·DMSO complex prepared as in Example I at a molar ratio of SO₃ to D-glucose unit of 6:1 while varying the reaction temperatures. The D.S. and viscosity of the products were determined as in Example I.

TABLE III

| Reaction Temperature °C. | (minutes) | % yield of Soluble Polymer | Sulfate (D.S.) | viscosity (dl./g.) |
| --- | --- | --- | --- | --- |
| 25° | 7 | 97 | 1.53 | 1.17 |
| 25° | 15 | 100 | 1.62 | 1.21 |
| 50° | 7 | 100 | 1.46 | 0.58 |
| 50° | 15 | 100 | 1.61 | 0.52 |
| 100° | 5 | 100 | 1.25 | 0.54 |
| 100° | 15 | 100 | 1.06 | 0.21 |

As shown in Table III, higher temperatures cause the sulfation to proceed slightly more rapidly at all reagent concentrations but also greatly increase the extent of depolymerization of the cellulose as indicated by the lowered viscosities of the recovered product.

EXAMPLE IV

One gram of sodium cellulose sulfate polymer prepared from Whatman cellulose using a 6:1 molar ratio of sulfur trioxide to D-glucose unit at 25° C. for 3 hours, and having a sulfate D.S. of 1.09 and limiting viscosity number of 1.80 dl./g. was dissolved in 100 ml. of a 0.15 N aqueous sodium chloride solution. The polymer was fractionated at 25° C. by 2.5 percent incremental increases in ethanol concentration. After each addition of ethanol, the solution was centrifuged and any precipitate obtained was collected. The precipitates were dissolved in water and washed into tared beakers containing Celite. After drying at 60° for 3 hours, the beakers were weighed and amount of polymer determined. The results of these experiments are shown in the following Table IV, in which the D.S. and viscosity of the polymer fractions were determined as in Example I.

TABLE IV

| Fraction | % Concentration of Ethanol | % yield of Cellulose Sulfate Precipitates | Sulfate (D.S.) | viscosity (dl./g.) |
| --- | --- | --- | --- | --- |

| | | | | |
|---|---|---|---|---|
| 1 | 40.0 | 20.0 | 1.11 | 2.35 |
| 2 | 42.5 | 12.5 | 1.08 | 2.00 |
| 3 | 45.0 | 25.5 | 1.08 | 1.28 |
| 4 | 47.5 | 17.0 | 1.03 | 0.43 |
| 5 | 60.0 | 16.0 | 1.12 | 0.22 |

As shown in Table IV, cellulose sulfated at a 6:1 molar ratio of sulfur trioxide to D-glucose unit, at 25° C. for 3 hours was rather uniform in molecular weight distribution as indicated by the precipitation curve obtained upon gradient addition of ethanol to a 1 percent aqueous solution of the sulfated product. Approximately 65 percent of the polymer precipitates between ethanol concentrations of 40 and 50 percent. The precipitated fractions are also quite uniform in sulfate ester content, although they show the expected viscosity differences due to a normal molecular weight distribution.

EXAMPLE V

In a further series of experiments, solid sulfur trioxide-dimethyl sulfoxide was prepared by adding 5 ml. liquid sulfur trioxide dropwise to an ice-cooled 500 ml. three-necked flask equipped with drying tube, stirrer and dropping funnel, and containing 100 ml. of carbon tetrachloride and 10 ml. of dimethyl sulfoxide. The resulting white solid was collected on a coarse sintered-glass funnel using a rubber dam cover to prevent passage of air through the complex. The complex was washed with dry acetone. The solid complex, thus obtained, was reacted with 1 g. of Whatman cellulose at 25° C. with varied amounts of added dimethyl sulfoxide by grinding for 20 minutes in a mortar in a dry-box continuously flushed with a stream of nitrogen. The mixture was then left for 3 hours in the dry-box, after which the product was dissolved in water, neutralized with sodium bicarbonate, and the polymeric product was isolated as described previously.

The results of these experiments are set forth in the following Table V, in which the molar ratios of $SO_3$ in the complex to the D-glucose unit in the cellulose was 21:1, and the quantity of DMSO employed is shown in column 2. The D.S. and viscosity of the resulting cellulose sulfate products were determined in the manner described in Example I.

TABLE V

| Polymer | Dimethyl Sulfoxide (ml.) | Soluble % Yield | Sulfate (D.S.) | viscosity (dl./g.) |
|---|---|---|---|---|
| a. | 5 | 7.2 | 1.27 | — |
| b. | 10 | 100.0 | 1.28 | 1.07 |
| c. | 15 | 99.7 | 1.60 | 1.05 |

As shown in Table V, high concentration of sulfur trioxide-dimethyl sulfoxide complex with very small amounts of dimethyl sulfoxide, on blending with cellulose and reaction at 25°C. for 3 hours, produce a cellulose sulfate of D.S. 1.3 to 1.6 with a satisfactory viscosity value.

EXAMPLE VI

In further experiments, one gram of cellulose, as derived from various raw materials, or one gram of starch were swelled by soaking in 10 to 20 grams of dimethyl sulfoxide. Following this, there was added the required amount of solid sulfur trioxide-dimethyl sulfoxide complex to give a 6:1 molar ratio of sulfur trioxide to anhydro-D-glucose unit.

The solid sulfur trioxide-dimethyl sulfoxide complex was prepared by adding liquid sulfur trioxide (15 ml) dropwise to 50 ml. of dimethyl sulfoxide with stirring at 17°-18 C. The solid complex was filtered on coarse sintered glass and washed with methylene chloride to remove excess dimethyl sulfoxide. The amount of sulfur trioxide in the solid complex was determined by alkalimetric titration. The formation of a complex between dimethyl sulfoxide and sulfur trioxide is an exothermic reaction. To avoid overheating with consequent darkening and violent boiling of the mixture, the sulfur trioxide should be added slowly to well stirred and efficiently cooled (lower than about 15° C.) dimethyl sulfoxide.

In the following Table VI, the cellulose or starch employed is set forth in column 1, the reaction temperature and time are set forth in columns 2 and 3, and the D.S. is set forth in column 4. The limiting viscosity, determined as in Example I, is set forth in column 5, and the viscosity in centipoises of a 1 percent aqueous solution of the product is set forth in column 6.

TABLE VI

| Material | Temperature(°C.) | Reaction time(min) | Sulfate (D.S.) | viscosity (dl./g.) | viscosity cps-1% Water solution |
|---|---|---|---|---|---|
| Whatman Cellulose | 15° | 15 | 1.48 | 1.4 | 10 |
| Chip Cello-phane | 15° | 30 | 1.52 | 1.4 | 15 |
| Avicel | 15° | 15 | 1.65 | 1.1 | 17 |
| Cellulose regenerated from triacetate | 15° | 15 | 1.60 | 0.8 | 9 |
| Sulfite Wood Pulp | 15° | 15 | 1.23 | 3.0 | 410 |
| Cotton sliver card | 25° | 240 | 1.80 | 4.0 | 1100 |
| Corn Starch | 15° | 15 | 2.00 | 1.6 | 51 |

In the experiments described in Example VI and Table VI, the sulfite pulp, acetylation grade, was obtained from Rayonier Inc., Whippany, N. J., and the microcrystalline cellulose (Avicel) and chip cellophane were obtained from FMC Corporation, American Viscose Div., Marcus Hook, Penn. The corn starch was obtained from Corn Products Company, Argo, Ill. The commercial Avicel, Whatman cellulose, sulfite pulp, cotton and corn starch were reacted as obtained. Cellulose triacetate prepared by the method of Tanghe, Genung and Mench in "Methods in Carbohydrate Chemistry," Vol. III, p. 194, R. L. Whistler and M. L. Wolfrom, Editors, Academic Press, New YorK (1963), was regenerated by the method of Cumberbirch and Harland, *J. textile Inst.*, 49, T679 (1958).

The procedure employed in Example VI, i.e., addition of solid sulfur trioxide-dimethyl sulfoxide complex to cellulose or starch which had been preswollen in dimethyl sulfoxide gave good sulfations. As described at page 3 of this specification, the prior admixture of the cellulose or starch with dimethyl sulfoxide is a preferable procedure. The preswollen cellulose or starch has been found more reactive than cellulose or starch which has not been preswollen.

The use of the solid sulfur trioxide-dimethyl sulfoxide complex in sulfating the cellulose or starch has been found preferable since the sulfur trioxide is more reactive in this form. When sulfur trioxide is added to dimethyl sulfoxide, it has been found that, with time, the sulfur trioxide continues to complex with any excess dimethyl sulfoxide which is present. This is indicated by the progressively lower titers obtained by neutralizing the complex mixture to a phenolphthalein end point by addition of alkali. It has been found that the sulfur trioxide-dimethyl sulfoxide complex containing larger quantities of dimethyl sulfoxide in the complex — as obtained by allowing the complex to stand in contact with dimethyl sulfoxide for a prolonged period of time such as 24 hours — is less reactive than the newly formed complex. This problem is eliminated by the use of the solid sulfur trioxide-dimethyl sulfoxide complex which is stable in storage at room temperature and retains its reactivity during prolonged storage. Also, of course, the sulfation complex is in a highly reactive form in solution when it is first prepared. Thus, when used in solution, the freshly prepared complex is preferably employed.

By use of the solid complex on preswollen cellulose or starch as in the experiments reported in Table VI, a completely water soluble product is usually obtained in 15 minutes at 15° without the need for using large amounts of dimethyl sulfoxide. As shown in Table VI, this procedure produces high viscosity cellulose sulfates. Cotton sliver requires a longer reaction time and higher molar ratio of sulfur trioxide-dimethyl sulfoxide complex per D-glucose unit since an insoluble product of D.S. 0.71 is obtained after 15 minutes. To obtain a water soluble cellulose sulfate it has been found that the D.S. must be greater than 1.0.

When using the solid sulfur trioxide-dimethyl sulfoxide complex, as in Example VI, the reaction can be conducted while using a relatively small amount of dimethyl sulfoxide sufficient to swell the cellulose or starch reactant. The amount of dimethyl sulfoxide employed will vary depending on the tendency of the cellulose or starch to swell. If the cellulose or starch has a greater tendency to swell, it will absorb more dimethyl sulfoxide and more will be used. Conversely, if the particular cellulose or starch employed has a lesser tendency to swell, it will absorb less dimethyl sulfoxide and less will be used.

EXAMPLE VII

In a further series of experiments, one gram of cellulose or corn starch was first swelled for several hours in 40 ml. of dimethyl sulfoxide. There was then added a solution of dimethyl sulfoxide containing a sufficient quantity of sulfur trioxide to give a 6:1 molar ratio of sulfur trioxide to D-glucose unit. The total volume in each instance, was 65 ml. after addition of the dimethyl sulfoxide solution.

The results of these experiments are shown in the following Table VII with the material employed shown in column 1 and the reaction time in hours in column 2. The percent yield of water soluble material is shown in column 3, the degree of sulfate substitution is shown in column 4, and the limiting viscosity (determined as in Example I) is set forth in column 5. All of the experiments reported in Table VII were conducted at a reaction temperature of 25° C.

TABLE VII

| Material | Reaction Time hr. | Yield of water soluble material | Sulfate (D.S.) | viscosity dl/g |
| --- | --- | --- | --- | --- |
| Whatman cellulose Chip | 3 | 100 | 1.81 | 0.80 |
| cellophane | 3 | 100 | 1.65 | 0.84 |
| Avicel | 3 | 100 | 1.83 | 0.64 |
| Cellulose from triacetate regenerated | 3 | 100 | 1.65 | 0.54 |
| Sulfite wood Pulp | 3 | 100 | 1.72 | 1.60 |
| Cellulose regenerated cotton linters from phosphoric acid | 4 | 89.2 | 1.31 | 2.60 |
| Cotton linters | 24 | 94.0 | 1.40 | 2.60 |
| Corn starch | 3 | 100 | 2.20 | 1.60 |

The sources of the materials set forth in column 1 of Table VII were the same as described in regard to the same materials used in the experiments reported in Table VI. As shown in Table VII the procedure there employed gave products of lower viscosity than the products obtained by the procedure employed in Example VI.

In the foregoing examples, the reaction mixture was worked up in the following manner: The reaction flask was cooled in an ice bath, 50 ml. of distilled water and three drops of phenolphthalein indicator solution was added, and 6 percent sodium hydroxide solution was added slowly to neutralization. The mixture was then stirred for 30 minutes, adding more sodium hydroxide, if necessary, to maintain neutrality. The polymer was then precipitated with ethanol, dissolved in 250 ml. of water, and dialyzed several days against distilled water. The water solution was concentrated under reduced pressure to about 150 ml. An aliquot was acidified and the polymer precipitated with ethanol. If addition of barium chloride to the supernatent showed a precipitate or barium sulfate, the polymer was again dialyzed. The concentrated water solution was adjusted to pH 7–7.5. The neutral solution was filtered on a medium sintered glass and isolated by freeze drying.

EXAMPLE VIII

The effect of the degree of sulfate substitution on the intrinsic viscosity (determined as in Example I) is shown in the following table.

TABLE VIII

| Cellulose | Sulfate | Viscosity |

| | D.S. | dl/g |
|---|---|---|
| Whatman | 1.10 | 1.80 |
| | 1.62 | 1.20 |
| | 1.81 | 0.80 |
| Avicel | 1.44 | 0.98 |
| | 1.83 | 0.64 |
| Cellulose regenerated from triacetate | 1.30 | 1.10 |
| | 1.65 | 0.54 |

As shown above, the intrinsic viscosity decreases as the degree of substitution increases. The sources of the precursor cellulose materials set forth in column 1 were the same as described previously.

The various cellulose sulfates and the starch sulfate of Tables VI and VII complexed with, and precipitated protein from 2 percent aqueous solutions of egg albumin or gelatin. Solutions made from the cellulose sulfates or from starch sulfate with limiting viscosity numbers larger than 0.45 were precipitated by barium ions but were not precipitated by calcium ions. Cellulose or starch sulfates with a degree of substitution of 1.3 or greater were precipitated by potassium ions. In these precipitation tests, 1 milliliter portions of 1 percent solutions of sulfated celluloses or sulfated starch were treated with 1 ml. each of the following solutions: 2 percent egg albumin solution, 2 percent gelatin solution, 3 percent calcium chloride solution, saturated potassium chloride solution, and 3 percent barium chloride solution.

The sulfated products of my invention may be employed in thickening glues. A glue prepared by adding 15 grams of bone glue to 105 cc. of water had a viscosity of 2.0 cps at 45° C. and 12 cps at 25° C. When this glue was prepared by adding 13.5 grams of bone glue and 1.5 grams of sodium cellulose sulfate, prepared according to my process, to 105 cc. of water, the glue had a viscosity of 390 cps at 45° C. and 950 cps at 25° C.

The dimethyl sulfoxide sulfur trioxide complex which I employ in sulfating cellulose or starch is a new composition of matter. It was found by alkalimetric titration that the complex contains dimethyl sulfoxide and sulfur trioxide in a 1:1 molar ratio. As described previously, the complex is formed by adding sulfur trioxide, e.g., 50 to 55 grams, to dimethyl sulfoxide, e.g., 100 grams. Precipitation of the complex begins when approximately 40 of the 50 to 55 grams of sulfur trioxide have been added.

On the addition of sulfur trioxide to a large excess of dimethyl sulfoxide, no precipitation of the complex occurs. A freshly prepared solution prepared in this manner has been found quite suitable for use in sulfation. The full strength of the sulfur trioxide is available for reaction and the larger the amount of sulfur trioxide present the greater is the degree of sulfation obtained.

If a solution of sulfur trioxide in dimethyl sulfoxide is allowed to stand prior to use in sulfation, I have found that a certain percentage of the sulfur trioxide which is present becomes unavailable as a sulfating agent. The unavailability of the sulfur trioxide for sulfation is due to continued complexing of dimethyl sulfoxide with sulfur trioxide such that the molar ratio of dimethyl sulfoxide to sulfur trioxide increases to in excess of 1:1. As the molar ratio of dimethyl sulfoxide to sulfur trioxide in the complex continues to increase, the reactivity of the complex decreases.

In practicing my process I found it preferable to use a sulfation complex containing from 1 to about 3 moles of dimethyl sulfoxide for each mole or sulfur trioxide. Such complexes were found to produce sulfation of cellulose or starch with a minimum of degradation.

Thus my novel sulfation complexes, which I found preferable in sulfating cellulose or starch with a minimum of degradation have the formula:

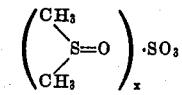

where $x$ ranges from 1 up to about 3. Preferably $x$ is equal to about 1 since the complex in this form contains the greatest amount of sulfur trioxide and is, therefore, more reactive in sulfating cellulose or starch.

It will be appreciated that, while the invention has been described with the aid of various specific examples including particular materials, reaction times and temperatures and the like, various modifications are possible within the broad scope of the invention, as set forth in the claims which follow.

I claim:

1. A complex having the formula:

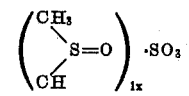

where said complex is a white solid at room temperature, is stable in storage at room temperature, retains its reactivity during prolonged storage at room temperature, is soluble in dimethyl sulfoxide, and is suitable for sulfating cellulose or starch with a minimum of degradation.

* * * * *